United States Patent

Rakes

[15] 3,671,833

[45] June 20, 1972

[54] BI-LEVEL ELECTRONIC SWITCH IN A BRUSHLESS MOTOR

[72] Inventor: Rodney G. Rakes, Bristol, Tenn.

[73] Assignee: Sperry Rand Corporation

[22] Filed: June 24, 1970

[21] Appl. No.: 49,413

[52] U.S. Cl. ....................318/254, 318/138, 307/315

[51] Int. Cl. ....................H02k 29/00

[58] Field of Search ....................307/315, 254; 313/254, 738, 313/696, 683

[56] References Cited

UNITED STATES PATENTS

| | | | |
|---|---|---|---|
| 2,949,543 | 8/1960 | Nordahl et al. | 307/315 X |
| 3,260,920 | 7/1966 | Shoemaker | 307/315 X |
| 3,364,407 | 1/1968 | Hill | 318/138 |
| 3,246,210 | 4/1966 | Lorenz | 307/315 X |
| 3,281,703 | 10/1966 | Bladen | 307/315 X |
| 3,381,144 | 4/1968 | Thomas | 307/254 |

FOREIGN PATENTS OR APPLICATIONS

| | | | |
|---|---|---|---|
| 452,666 | 5/1968 | Switzerland | 307/315 |

*Primary Examiner*—G. R. Simmons
*Attorney*—S. C. Yeaton

[57] ABSTRACT

An electronic switch for driving a load capable of operating in high or low current states includes a pair of transistors arranged in a modified Darlington circuit for switching power to the load. The input and output transistors of the pair are coupled through a diode and adjusted so that the diode is back-biased when the load is in its normal low current condition, but forward-biased when the load requires a high current. With the diode back-biased, the output transistor saturates at a low voltage level and thus provides a minimum switch power loss at the normal operating point. With the diode forward-biased, however, the switch provides high current capability for driving the load in the high current state.

1 Claim, 3 Drawing Figures

INVENTOR.
RODNEY G. RAKES
BY Joseph M Roehl
ATTORNEY

BI-LEVEL ELECTRONIC SWITCH IN A BRUSHLESS MOTOR

BACKGROUND OF THE INVENTION

1. Field of the Invention

The invention relates to electronic switching circuits and more particularly to high efficiency electronic switching circuits for driving variable impedance loads.

2. Description of the Prior Art

Electronic switches are sometimes required to drive variable impedance loads. Brushless d.c. motors, for example, require a switching means to steer current to appropriate stator windings in synchronism with rotation of the rotor. Known types of switching circuits such as Darlington switches are frequently used for this purpose.

U.S. Pat. No. 3,364,407 issued to R. K. Hill on Jan. 16, 1968, and assigned to the present assignee, for instance, concerns such a motor and illustrates how various solid state switching circuits may be used to advantage for this purpose. Such motors normally present a particular impedance to the switching circuit. However under certain unusual conditions, such as during start-up, the motor impedance drops to a low level and requires relatively high current. Prior art switching circuits such as those disclosed in the aforementioned patent cause a significant voltage drop across the switch during normal operation. This represents an appreciable power loss during such normal operation. The switching circuit of the present invention automatically adjusts to the impedance variations of the load so as to entail a low power loss in the switch during normal operation, yet provides high current capability during the presence of abnormal load requirements.

SUMMARY OF THE INVENTION

An electronic switch constructed in accordance with the principles of the present invention utilizes a diode feedback circuit which allows a low voltage drop across a switch at low load current levels yet automatically switches to a higher current capability at high current levels. Increased overall circuit efficiency is thus provided at the lower levels of load current due to the small voltage drop across the switch under these conditions.

DESCRIPTION OF THE PREFERRED EMBODIMENT

Figures 1, 2:
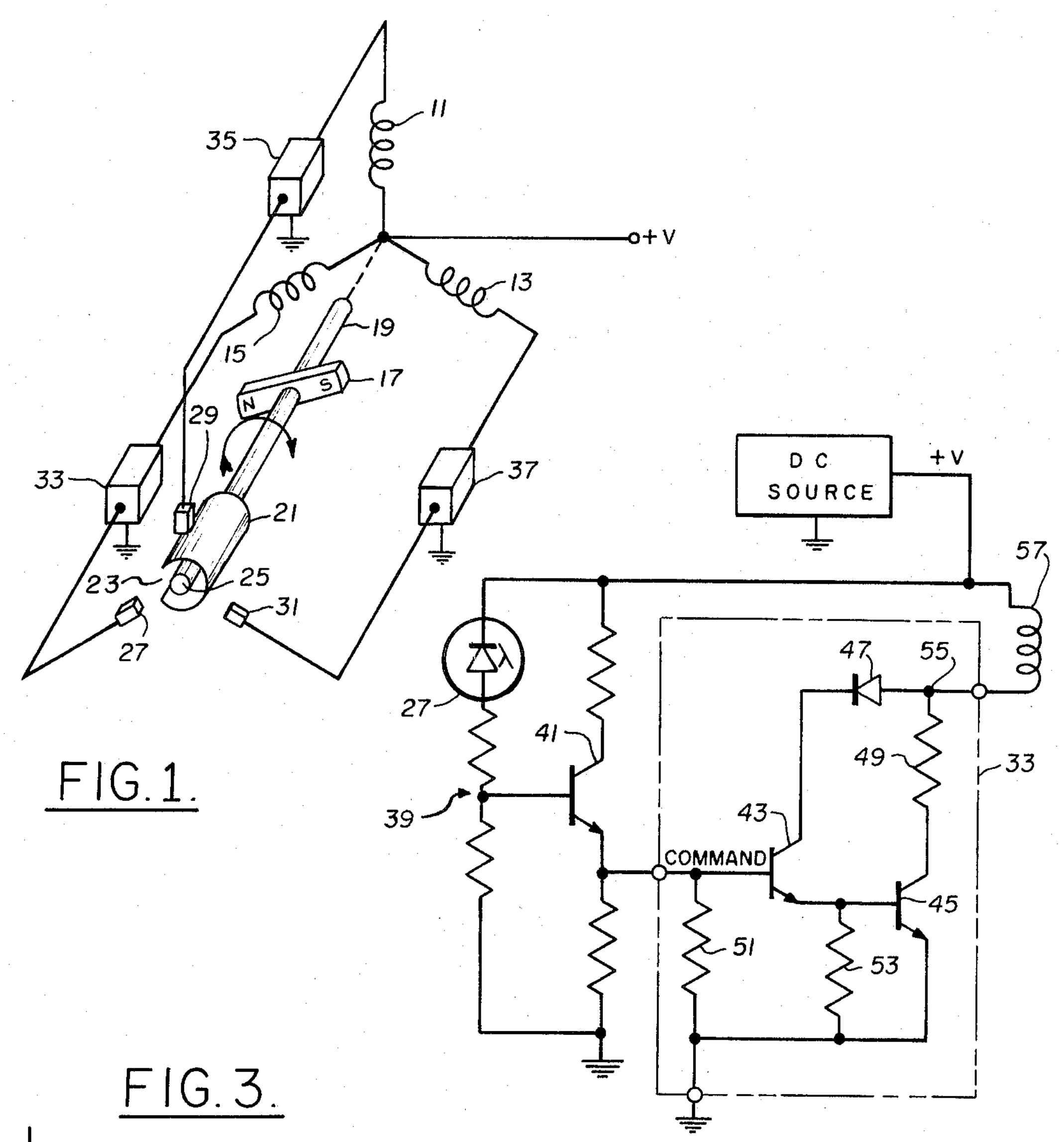
FIG. 1 is a diagram illustrating an environment in which the invention may be used.
FIG. 2 is a schematic diagram illustrating the circuit of the invention.

FIG. 1 functionally illustrates a typical environment in which the invention may be used. The invention is particularly useful in switching operations concerned with brushless d.c. motors wherein commutation is accomplished by electronic switching means. Such a motor typically contains a plurality of stator windings represented schematically as the windings 11, 13 and 15 supplied from a source of voltage +V. The rotor consists of a permanent magnet 17 magnetized along its length and rotatable with a shaft 19. Also mounted integrally on the shaft is a rotating light shield 21 containing an aperture 23 surrounding a light source 25. As the rotor rotates, a beam of light emerging from the aperture 23 rotates in synchronism with the rotor. Photosensors 27, 29 and 31, arranged around the periphery of the light shield, intercept the beam as it rotates. The photosensors provide a signal to the switching circuits 33, 35 and 37, which in turn, supply conducting paths for the appropriate stator windings. Thus the stator windings may be energized in synchronism with rotation of the rotor from the voltage source +V through the corresponding switch.

For example, as the light beam rotates, the photosensor 27 will be illuminated. This closes the switch 33 so as to energize the winding 15, causing rotation of the rotor 17. As rotation continues, the photosensor 27 eventually becomes darkened, the photosensor 29 is illuminated, the switch 35 is closed and the winding 11 is energized thus continuing rotation of the rotor.

Such motors normally operate with a relatively low running current. Under some conditions, however, the stator windings draw considerable current so that the switches must be capable of supplying large currents for limited periods of time. While the motor is being brought up to speed, for instance, very little back EMF is induced in the windings so that they effectively have a low impedance and draw a relatively high starting current.

A wide variety of commutating switches is known in the art. In one conventional system, a signal from a photosensor is passed through a preamplifier so as to provide a command signal adequate to close the corresponding switch. The switch in some prior art circuit depends upon a conventional Darlington pair.

FIG. 2 illustrates a switch employing the principles of the invention as applied to the brushless d.c. motor. Numerals corresponding to those used in FIG. 1 have been applied to FIG. 2 in order to facilitate understanding of the operation of the switch in an environment such as that functionally illustrated in FIG. 1. A representative switch is thus indicated as the block 33. The photosensor 27 conventionally takes the form of a photo diode connected between the +V source and a common ground through a voltage divider 39. Conventional transistor preamplifier 41 supplies a command signal to the switch 33, thus when the photosensor 27 is illuminated, the transistor 41 is driven into conduction and a specific positive command signal is developed. When the photosensor 27 is darkened, essentially ground potential is applied to the switch 33 and the command signal disappears.

The command signal is applied to the base electrode of an input transistor 43. The input transistor 43, in turn, has its emitter electrode connected directly to the base electrode of an output transistor 45 and its collector electrode coupled to the collector electrode of the output transistor 45 through a diode 47 and a collector resistor 49.

A resistor 51 couples the base electrode of the input transistor to ground and a resistor 53 couples the base electrode of the transistor 45 to ground potential.

Since the diode 47 is connected directly to the resistor 49 at a point 55, the voltage applied to the diode 47 is the voltage at the load 57.

The resistors 51 and 53 provide shunt paths for leakage currents to improve stability of the current at high ambient temperatures or high power dissipation in the transistors. The resistor 49 ordinarily has a low value and serves to share some of the power that otherwise would be dissipated in the output transistor 45 when the circuit is operating at high power levels. The transistor 45 shares the bulk of the load current with the transistor 43 which provides base drive current when required. The diode 47 provides a feedback current path to increase the base current of the transistor 45 when the load is operating in its high current condition.

The resistors 51, 53 and 49 are not essential to the operation of the circuit; however, their use improves the stability of the circuit. The resistor 49 is ordinarily a low value resistance and in many instances may be eliminated entirely.

Figure 3:
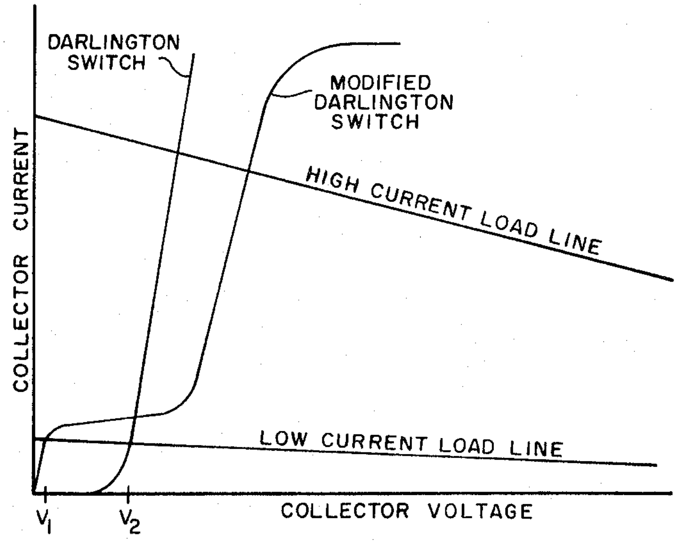
FIG. 3 is a graph useful in explaining the operation of the invention.

FIG. 3 illustrates the operation of the circuit in graphical form.

The characteristics of the prior art Darlington switch are indicated in the graph of FIG. 3 for comparison with the operating characteristics of the modified Darlington switch of the present invention. The graph also indicates a typical load line for a load operating in its high current state and another load line for the same load operating in its low current state.

In the modified Darlington switch, the transistor 45 saturates in response to a command signal when the load is operating in its low current state as indicated by the plateau of the characteristic curve. The quiescent operating point for this condition occurs at a low collector voltage $V_1$. Under these conditions, the collector voltage of the transistor 45 drops to a value typically in the order of 0.1 volts. This back biases the diode 47 since the base of the transistor 43 will be typically at a level of 1.4 volts under these conditions.

When the load is operating in its high current condition, the transistor 45 begins to come out of saturation at the instep of the characteristic curve and its collector voltage rises. When the collector voltage of transistor 45 reaches approximately 1.4 volts, transistor 43 begins to draw collector current and provides additional base current for the transistor 45. The voltage at point 55 is maintained at approximately 1.4 volts. Thus with no change in the level of the command signal the switch is now capable of providing a much higher load current.

Referring again to FIG. 3, it will be noticed that under the normal operation conditions in which the load is drawing a low current, the modified Darlington switch of the present invention quickly rises to the quiescent level at a low collector voltage $V_1$. In contrast to this, a switch of the conventional Darlington type requires a considerable collector voltage $V_2$ before sufficient current can be reached to satisfy the low current requirements of the load. Since the loss in either of these switches is equal to the current through the switch multiplied by the collector voltage across the switch, it can be seen that the switch of the present invention dissipates considerably less energy than the Darlington switch of the prior art. In practical situations, this ratio may be as great as 10 to 1.

Under the low current conditions, the switch of the present invention provides a gain that may be represented as A. Under high current conditions, the switch of the present invention then provides a gain of $A^2$. This effect is useful in that it provides high overall efficiency in the normal low current operating condition. However, the switch is capable of providing high currents when the load demand is increased.

Although the switch has been described as operating in a brushless d.c. motor environment, it will be appreciated that the same switch may be used in other environments where load requirements vary between high and low levels.

Although transistors of a given conductivity type have been described, it will be appreciated that the opposite conductivity types may be used if desired.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A brushless d.c. motor of the type having a plurality of stator windings arranged around the periphery of the motor; a permanently magnetized rotor rotatable therebetween; and commutating means for successively energizing said stator windings from a d.c. source in synchronism with rotation of the rotor, said commutating means including individual rotor position sensing means corresponding to each stator winding; individual amplifying means for producing command signals having a specified amplitude in response to output signals from said sensing means; and individual switching means coupled to each sensing means for switching energizing current to the associated stator winding in response to a command signal; each of said switching means including a diode, and input and output transistors each having base, collector, and emitter electrodes, both of said transistors having their base and emitter electrodes coupled to one side of said source and their collector electrodes coupled to the associated stator winding; the emitter electrode of said input transistor being further coupled to the base electrode of said output transistor, said input transistor being coupled to the stator winding through the diode; said diode being oriented to permit current flow from said winding to the input transistor; said output transistor being selected to saturate in response to a command signal when the motor is running at its normal speed, said specified amplitude being larger than the saturation voltage of said output transistor whereby the diode is backbiased in response to a command signal when the output transistor is saturated.

* * * * *